(12) United States Patent
Lee et al.

(10) Patent No.: US 12,322,552 B2
(45) Date of Patent: Jun. 3, 2025

(54) MULTILAYER CAPACITOR INCLUDING A RARE EARTH ELEMENT AND ZIRCONIUM

(71) Applicant: SAMSUNG ELECTRO-MECHANICS CO., LTD., Suwon-si (KR)

(72) Inventors: Je Hee Lee, Suwon-si (KR); Seung In Baik, Suwon-si (KR); Ji Su Hong, Suwon-si (KR); Jae Sung Park, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 131 days.

(21) Appl. No.: 17/994,631

(22) Filed: Nov. 28, 2022

(65) Prior Publication Data

US 2023/0207203 A1    Jun. 29, 2023

(30) Foreign Application Priority Data

Dec. 29, 2021   (KR) .................. 10-2021-0191598

(51) Int. Cl.
*H01G 4/12* (2006.01)
*H01G 4/012* (2006.01)
(Continued)

(52) U.S. Cl.
CPC .......... *H01G 4/1227* (2013.01); *H01G 4/012* (2013.01); *H01G 4/1245* (2013.01); *H01G 4/224* (2013.01); *H01G 4/30* (2013.01)

(58) Field of Classification Search
CPC .... H01G 4/1227; H01G 4/012; H01G 4/1245; H01G 4/224; H01G 4/30; H01G 4/1209;
(Continued)

(56) References Cited

U.S. PATENT DOCUMENTS

2016/0155570 A1* 6/2016 Shimada ................. B32B 18/00
                                                    29/25.42
2017/0271082 A1* 9/2017 Yoon ....................... H01G 4/228
(Continued)

FOREIGN PATENT DOCUMENTS

JP    2017-199859 A    11/2017
JP    2019-129232 A    8/2019
(Continued)

*Primary Examiner* — Nathan Milakovich
*Assistant Examiner* — Daniel M Dubuisson
(74) *Attorney, Agent, or Firm* — Morgan, Lewis & Bockius LLP (57) ABSTRACT

A multilayer capacitor is provided. The multilayer capacitor includes a body and an external electrode disposed outside the body, wherein the body includes an active portion including a plurality of dielectric layers and a plurality of internal electrodes stacked with dielectric layers interposed therebetween, and a side margin portion covering at least one side surface of side surfaces to which the internal electrodes are exposed in the laminate, wherein the side margin portion includes a dielectric including a $BaTiO_3$-based main component, a first subcomponent including a rare earth element, and a second subcomponent including Zr, wherein, based on a molar content per 100 moles of the main component, when a molar content of the rare earth element is RE, a molar content of Zr and RE satisfies $0.20 \leq Zr/RE \leq 0.37$.

14 Claims, 9 Drawing Sheets

(51) Int. Cl.
*H01G 4/224* (2006.01)
*H01G 4/30* (2006.01)

(58) Field of Classification Search
CPC ........ C04B 35/4682; C04B 2235/3201; C04B 2235/3203; C04B 2235/3224; C04B 2235/3225; C04B 2235/3227; C04B 2235/3244; C04B 2235/3418; C04B 2235/6582; Y02E 60/13
See application file for complete search history.

(56) References Cited

U.S. PATENT DOCUMENTS

| | | |
|---|---|---|
| 2017/0287636 A1* | 10/2017 | Sakurai ................ H01G 4/1227 |
| 2017/0316883 A1 | 11/2017 | Yamaguchi |
| 2019/0228911 A1 | 7/2019 | Inomata et al. |
| 2020/0039887 A1* | 2/2020 | Ariizumi .............. H01G 4/1236 |
| 2021/0020375 A1 | 1/2021 | Park et al. |
| 2021/0272755 A1 | 9/2021 | Kato |
| 2022/0415576 A1* | 12/2022 | Tsushima ............. H01G 4/1209 |
| 2023/0046574 A1* | 2/2023 | Yamaguchi ........ C04B 35/62685 |

FOREIGN PATENT DOCUMENTS

| | | |
|---|---|---|
| JP | 2021-136375 A | 9/2021 |
| KR | 10-2019-0116132 A | 10/2019 |

* cited by examiner

MULTILAYER CAPACITOR INCLUDING A RARE EARTH ELEMENT AND ZIRCONIUM

CROSS-REFERENCE TO RELATED APPLICATION(S)

This application claims benefit under 35 USC 119 (a) of Korean Patent Application No. 10-2021-0191598 filed on Dec. 29, 2021 in the Korean Intellectual Property Office, the entire disclosure of which is incorporated herein by reference for all purposes.

TECHNICAL FIELD

The present disclosure relates to a dielectric composition and a multilayer capacitor.

BACKGROUND

A capacitor is a device capable of storing electricity, and, when two electrodes are opposed to each other and a voltage is applied thereto, an electrical charge is accumulated in each electrode. When a DC voltage is applied, current flows inside the capacitor while an electrical charge is stored, but when accumulation is completed, current does not flow. On the other hand, when an alternating voltage is applied, an alternating current flows while the polarities of the electrodes change.

Depending on the type of insulator provided between the electrodes, such capacitors may be classified as one of several types, such as an aluminum electrolytic capacitor including an electrode of aluminum and having a thin oxide film between aluminum electrodes, a tantalum capacitor using tantalum as an electrode material, a ceramic capacitor using a dielectric with a high dielectric constant such as barium titanate, between electrodes, a Multilayer Ceramic Capacitor (MLCC) using a high-k ceramic as a dielectric provided between the electrodes in a multilayer structure, a film capacitor using a polystyrene film as a dielectric between electrodes or the like.

Thereamong, multilayer ceramic capacitors have the advantage of excellent temperature characteristics and frequency characteristics and are implemented in a small size, and are thus widely applied in various fields such as high-frequency circuits. Recently, attempts to implement a smaller multilayer ceramic capacitor have continued, and to this end, a dielectric layer and an internal electrode are formed to be thin.

As a method to increase capacity while miniaturizing a multilayer capacitor, the internal electrode is exposed in a width direction of the body, thereby significantly increasing an area of the internal electrode in the width direction through a marginless design. After manufacturing such chips, a process of separately attaching side margin portions to the electrode exposed surfaces in the width direction of the chip is applied in the completed operation of the process. However, in the case of the side margin construction method, it is difficult to ensure the densification of the side margin portion itself, and there is a problem that voids or cracks may occur between the interfaces of the active portion and the side margin portion. Accordingly, there is a need to apply a dielectric material capable of improving impact resistance and crack resistance of the side margin portion in ultra-small and high-capacity products.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a dielectric composition having high reliability and a multilayer capacitor using the same.

According to an aspect of the present disclosure, a multilayer capacitor is provided. The multilayer capacitor includes, specifically, a body and an external electrode disposed outside the body, wherein the body includes an active portion including a plurality of dielectric layers and a plurality of internal electrodes stacked with dielectric layers interposed therebetween, and a side margin portion covering at least one side surface of side surfaces from which the internal electrodes extend, wherein the side margin portion includes a dielectric including a $BaTiO_3$-based main component, a first subcomponent including a rare earth element, and a second subcomponent including Zr, wherein, based on a molar content of the $BaTiO_3$-based main component per 100 moles, when a molar content of the rare earth element is RE, a molar content of Zr and RE satisfy $0.20 \leq Zr/RE \leq 0.37$.

In an embodiment, the rare earth element may include at least one element selected from the group consisting of Sc, Y, La, Nd, Eu, Gd, Tb, Dy, Ho, Er, Yb, and Lu.

In an embodiment, the side margin portion may further include a third subcomponent including Ba.

In an embodiment, the molar content of Zr and a molar content of Ba may satisfy $0.25 \leq Zr/Ba \leq 0.85$.

In an embodiment, a molar content of Zr in an interface portion that is a region, adjacent to the side margin portion of the active portion may be higher than a molar content of Zr in a central portion of the active portion.

In an embodiment, a central portion of the active portion may not include Zr.

In an embodiment, a dielectric of the side margin portion may include a dielectric grain having a core-shell structure including a core portion and a shell portion having a composition different from that of the core portion.

In an embodiment, the shell portion may satisfy $0.20 \leq Zr/RE \leq 0.37$.

In an embodiment, the rare earth element may include Tb.

In an embodiment, the rare earth element may include Tb and Dy.

In an embodiment, the molar content of Zr may be 0.50 to 1.7 moles based on 100 moles of the $BaTiO_3$-based main component.

In an embodiment, the molar content of Zr may be 0.50 to 1.5 moles based on 100 moles of the $BaTiO_3$-based main component.

In an embodiment, RE may be 1.6 to 5.0 moles based on 100 moles of the $BaTiO_3$-based main component.

In an embodiment, the molar content of Zr and RE satisfy $0.20 \leq Zr/RE < 0.33$.

In an embodiment, the molar contents of Zr and Ba satisfy $0.25 \leq Zr/Ba \leq 0.75$.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Figure 1:
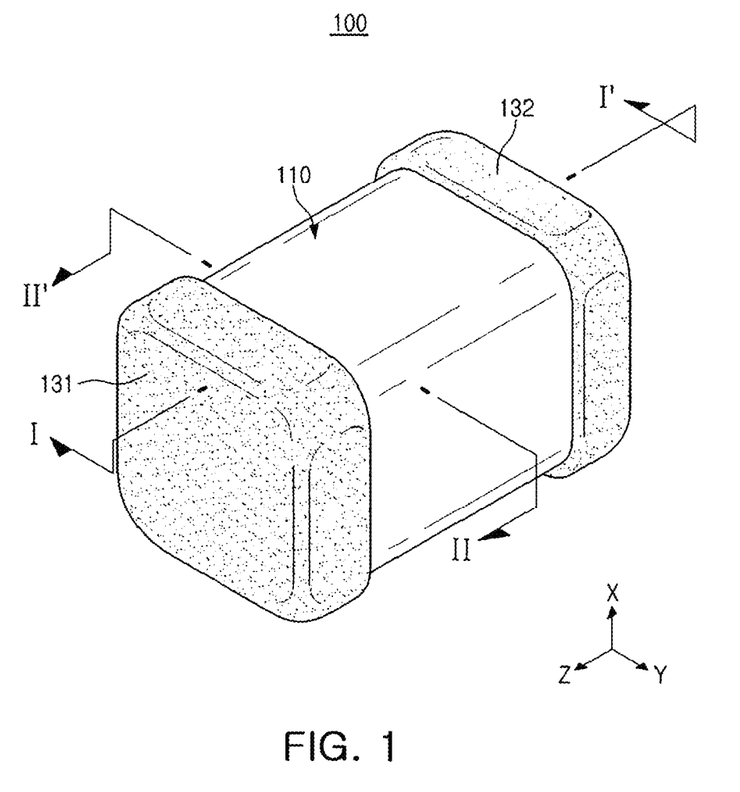
FIG. 1 is a perspective view schematically illustrating an external appearance of a multilayer capacitor according to an embodiment of the present disclosure.
Figure 2:
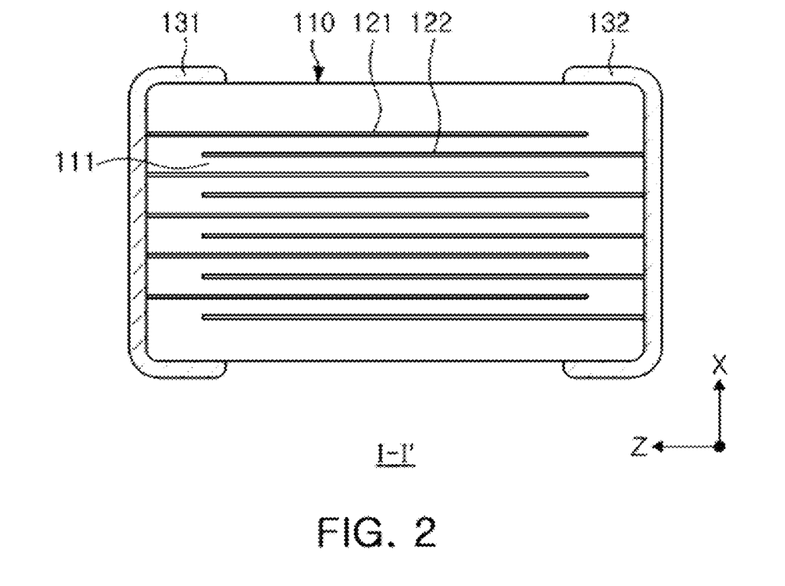
FIG. 2 is a cross-sectional view taken along line I-I' in the multilayer capacitor of FIG. 1.
Figure 3:
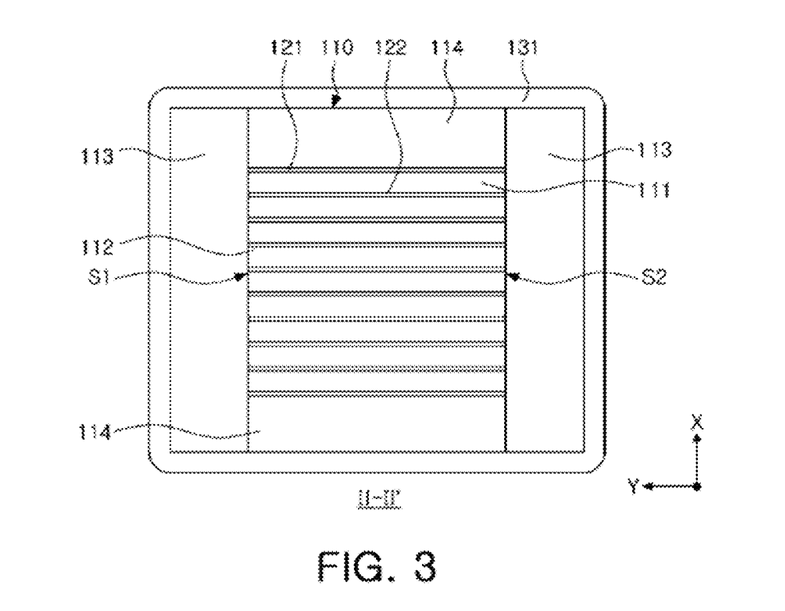
FIG. 3 is a cross-sectional view II-II' in the multilayer capacitor of FIG. 1.
Figure 4:
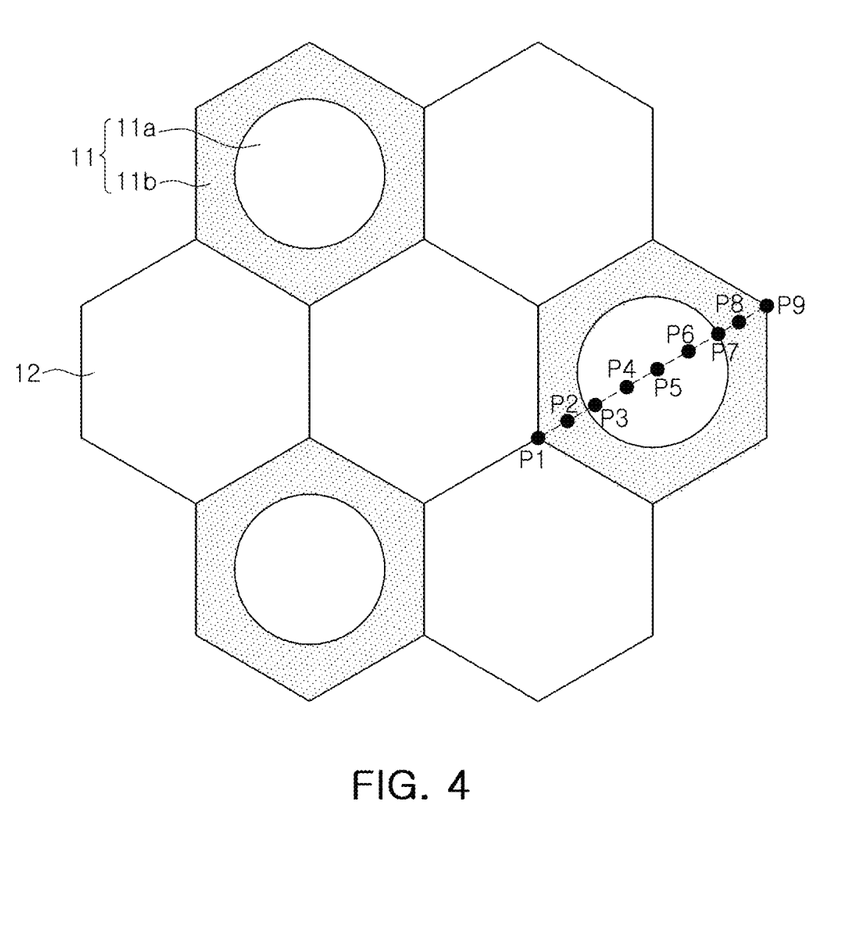
FIG. 4 is a schematic diagram for illustrating a microstructure of a dielectric layer of the present disclosure.

FIG. 1 is a perspective view schematically illustrating an external appearance of a multilayer capacitor according to an embodiment of the present disclosure. FIG. 2 is a cross-sectional view taken along line I-I' in the multilayer capacitor of FIG. 1. FIG. 3 is a cross-sectional view II-II' in the multilayer capacitor of FIG. 1. FIG. 4 is a schematic diagram for illustrating the microstructure of the dielectric layer of the present disclosure.

Referring to FIGS. 1 to 3, a multilayer capacitor 100 according to an embodiment of the present disclosure includes a body 110 and external electrodes 131 and 132, wherein the body 110 includes an active portion 112 including a plurality of dielectric layers 111 and a plurality of internal electrodes 121 and 122 stacked with the dielectric layers 111 interposed therebetween, and a side margin portion 113 covering at least one side surface of the active portion 112 to which the internal electrodes 121 and 122 are exposed or from which the internal electrodes 121 and 122 extend.

The active portion 112 includes a stacked structure in which a plurality of dielectric layers 111 are stacked in a first direction (X-direction), and may be obtained by, for example, stacking a plurality of green sheets and then sintering the same. By such a sintering process, the plurality of dielectric layers 111 may have an integrated shape. The active portion 112 corresponds to an active region including a plurality of internal electrodes 121 and 122 and forming capacitance, and a cover portion 114 without the plurality of internal electrodes 121 and 122 may be disposed. The dielectric layer 111 included in the active portion 112 is in a sintered state, and a boundary between the adjacent dielectric layers 111 may be integrated to an extent that it is difficult to confirm without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved into $BaTiO_3$, and the like. As a raw material for forming the dielectric layer 111, various ceramic additives, organic solvents, plasticizers, binders, dispersants, and the like may be added to powder particles such as barium titanate ($BaTiO_3$), and the like depending on the purpose of the present disclosure. For example, the dielectric layer 111 may be formed by applying and drying a slurry formed by including powder such as barium titanate ($BaTiO_3$) on a carrier film to prepare a plurality of ceramic sheets. The ceramic sheet may be formed by mixing ceramic powder, a binder, and a solvent to prepare a slurry, and manufacturing the slurry into a sheet having a thickness of several μms by a doctor blade method, but is not limited thereto.

As in the illustrated form, the side margin portion 113 may be disposed on surfaces S1 and S2 of the active portion 112 perpendicular to a second direction (Y direction), and the second direction (Y direction) is a direction perpendicular to the first direction (X direction) and is also perpendicular to a third direction (Z direction), which is a direction in which the external electrodes 131 and 132 face each other. The side margin portion 113 may be attached to a side surface of the active portion 112 to which the internal electrodes 121 and 122 are exposed, in an operation before sintering after the active portion 112 is manufactured. In this case, unlike the active portion 112, the side margin portion 113 may have a relatively low packing density of ceramic particles for reasons such as not separately undergoing a pressing process. In this embodiment, the dielectric composition having the above-described composition conditions is applied to the side margin portion 113, and thus, after sintering, the dielectric may have excellent densification and fine and uniform crystal grains.

Specifically, the side margin portion 113 includes a dielectric including a $BaTiO_3$-based main component, a first subcomponent including a rare earth element, and a second subcomponent including wherein, based on a molar content per 100 moles of the main component, when the molar content of the rare earth element is RE, the molar content of Zr and RE satisfies $0.20 \leq Zr/RE \leq 0.37$ or $0.20 \leq Zr/RE < 0.33$, such that density, strength characteristics, uniformity of grain size, etc. may be excellent. That is, when the dielectric included in the side margin portion 113 satisfies the above composition conditions, a sintered body having improved density and effectively suppressed grain growth can be obtained. Accordingly, the side margin portion 113 including the dielectric may have improved density, strength characteristics, and uniformity of grain size. For example, as a main component, the amount of $BaTiO_3$ may be at least 50% by weight of a total weight of $BaTiO_3$ and subcomponent (s) in a paste or material used to form the side margin portion. The molar content of Zr may be 0.50 to 1.7 moles or 0.50 to 1.5 moles based on 100 moles of the $BaTiO_3$-based main component. RE may be 1.6 to 5.0 moles based on 100 moles of the $BaTiO_3$-based main component.

The composition conditions of the subcomponents in the dielectric included in the side margin portion 113 are set based on the functions of the main components and experimental examples to be described below. Sintering of the dielectric composition occurs due to movement of a material between ions, and largely goes through steps of densification and grain growth. Here, densification occurs by surface diffusion of ions, and grain growth occurs by interfacial movement to lower a total surface area. In this case, as the number of grain boundaries, which is a high resistance component, exists in the dielectric, mobility of charges can be lowered. Therefore, when the dielectric grains are refined to increase a fraction of the grain boundaries, a dielectric constant of the dielectric can be improved. However, in a thin layer environment (e.g., when a thickness of the dielectric layer is 0.5 μm or less) in which electrical field strength is increased at the grain boundary, a Schottky barrier may be lowered, and thus electrical conductivity may be increased. In addition to the grain boundary, an element having a higher work function than the $BaTiO_3$-based material can be added as a subcomponent so that a high potential barrier can be formed at an interface between the core portion and the shell portion of the dielectric grain, and a method of making a surface of the $BaTiO_3$-based main component particles into an ionized coating surface may be used.

In addition to the consideration of the grain boundary and the interface in the core-shell structure, it is advantageous to have a low concentration of electric charges in order to make the dielectric thin and to have a high level of insulation resistance in a high-field environment. Specifically, when minimizing oxygen vacancy defects, acting as a main cause of MLCC insulation resistance deterioration, insulation resistance deterioration due to P-N junction formation in grains can be prevented, and in this embodiment, a rare earth element was used as an element having high N-type tendency in order to suppress a conduction phenomenon in the grains. In addition, in the case of the Zr subcomponent, it is effective in controlling the grain growth of the dielectric and controlling a molar ratio of Ba—Ti. According to the research conducted by the inventors of the present disclosure, when a content ratio of Zr and rare earth elements is optimized, an effect of improving reliability of the dielectric may be confirmed.

A more specific example will be described with respect to the subcomponents of the dielectric included in the side margin portion 113. First, the rare earth elements may include at least one selected from a group comprising Sc, Y, La, Nd, Eu, Gd, Tb, Dy, Ho, Er, Yb, and Lu. In addition, the side margin portion 113 may further include a third subcomponent including Ba. In this case, the molar content of Zr and Ba may satisfy the condition of $0.25 \leq Zr/Ba \leq 0.85$ or $0.25 \leq Zr/Ba \leq 0.75$.

In the present embodiment, as described above, a Zr component may be added to the side margin portion 113, and in the case of the active portion 112, a molar content of Zr in an interface portion adjacent to the side margin portion 113 may be higher than a molar content of Zr in a central portion. Furthermore, the central portion of the active portion 112 may substantially not include Zr. For example, the central portion of the active portion may refer to a central portion of the active portion in a cross-section of the body. In some embodiments, the central portion may include regions that may be nearer to the center of the active region in the cross-section of the body than to the interface portion of the active portion.

A dielectric of the side margin portion 113 may include a dielectric grain having a core-shell structure, which will be described with reference to FIG. 4. The dielectric of the side margin portion 113 may include a dielectric grain 11 having a core-shell structure including a core portion 11a and a shell portion 11b having a different composition, and may also include a dielectric grain 12, other than the core-shell structure. In this case, the dielectric grains 11 and 12 include a $BaTiO_3$-based main component, a first subcomponent including a rare earth element, and a second subcomponent including Zr, wherein based on a molar content per 100 moles of the main component, when a molar content of the rare earth element is RE, a molar content of Zr and $0.20 \leq Zr/RE \leq 0.37$ are satisfied. As a more specific example, the above-described first and second subcomponents may be dissolved in the $BaTiO_3$-based main component to form the shell portion 11b. Accordingly, the shell portion 11b includes a $BaTiO_3$-based main component, a first subcomponent including a rare earth element, and a second subcomponent including Zr, and when the molar content of the rare earth element is RE, based on the molar content per 100 moles of the main component, the molar content of Zr and RE may satisfy $0.20 \leq Zr/RE \leq 0.37$. In the following example, it will be described that the first and second subcomponents are present in the shell portion 11b, but some rare earth subcomponents may also be present in the core portion 11a.

When a diameter of the core portion 11a in the dielectric grain 11 of the core-shell structure is D1, a condition of 5 nm$\leq$D1$\leq$100 nm may be satisfied. When a diameter of the dielectric grain 11 is D2, a condition of 50 nm$\leq$D2$\leq$600 nm may be satisfied. In this case, the diameter of the dielectric grains 11 may be a value obtained by measuring an area of each dielectric grain 11, and converting the area into a diameter equivalent to a circle having the area as the diameter of the dielectric grain 11. In the dielectric grain 11 of the core-shell structure, a molar content of the rare earth element and Zr may be analyzed by drawing a line segment starting from one side of one grain 11 and ending at the other side as illustrated in FIG. 4, taking nine dots P1 to P9 at equal intervals, and a content of at least one of rare earth elements and Zr in P1 to P9 may be analyzed using STEM/EDS. More specifically, after obtaining an image by scanning one region of the dielectric by STEM, a content of an element to be detected at positions P1 to P9 can be analyzed by STEM/EDS analysis. Through this analysis, a boundary between the core portion 11a and the shell portion 11b can be determined. For example, a region in which the rare earth element or Zr is not substantially detected while going from a surface of the dielectric grain 11 to an inside can be determined as the boundary therebetween.

On the other hand, the subcomponents included in the above-described dielectric may be added in a form of oxides or carbonates, but after sintering, the subcomponents may exist in a form of a solid solution in the $BaTiO_3$-based main component rather than in the form of oxides or carbonates. However, a content ratio of the main elements of the subcomponents may be maintained almost the same, and the contents of each element of the dielectric layer after sintering may be calculated based on the contents of the main component and subcomponents included in the dielectric composition before sintering. In addition, the content of each element included in the dielectric of the active portion 112, the side margin portion 113, and the cover portion 114 may be measured using a non-destructive method or a destructive method. For example, in the case of a non-destructive method, TEM-EDS can be used to analyze the components inside the dielectric grain in a central portion of the chip. Specifically, a thinned analysis sample is prepared using a focused ion beam (FIB) device in a region including a dielectric layer among a cross-section of a sintered body. Then, a damaged layer on a surface of the thinned sample is removed using Ar ion milling, and then, mapping and quantitative analysis of each component in the image obtained using STEM-EDS is performed. In this case, the quantitative analysis graph of each component can be obtained as a mass fraction of each element, which can be represented in terms of mole fraction or atomic fraction. In addition, in the case of a destructive method, the multilayer capacitor is pulverized and the internal electrode is removed, and then the dielectric part is selected. Dielectric components of the selected dielectric may be analyzed using a device such as Inductively Coupled Plasma Spectroscopy (ICP-OES), Inductively Coupled Plasma Mass Spectrometry (ICP-MS), or the like.

A plurality of internal electrodes 121 and 122 may be obtained by printing a paste containing a conductive metal with a predetermined thickness on one surface of a ceramic green sheet and then sintering the green sheet. In this case, as illustrated in FIG. 2, the plurality of internal electrodes 121 and 122 may include first and second internal electrodes 121 and 122 exposed to ends of the body 110 facing each other in the third direction (Z direction). The first and second internal electrodes 121 and 122 are connected to different external electrodes 131 and 132 to have different polarities when driven, and may be electrically separated from each other by the dielectric layer 111 disposed therebetween. However, the number of the external electrodes 131 and 132 or a connection method thereof to the internal electrodes 121 and 122 may be changed depending on embodiments. Examples of main constituent materials of the internal electrodes 121 and 122 may include nickel (Ni), copper (Cu), palladium (Pd), silver (Ag), and the like, and alloys thereof may also be used.

External electrodes 131 and 132 are formed outside of the body 110, and may include first and second external electrodes 131 and 132 connected to the first and second internal electrodes 121 and 122, respectively. The external electrodes 131 and 132 may be formed by a method of preparing a material containing a conductive metal as a paste and then applying the paste to the body 110, or the like. Examples of the conductive metal may include nickel (Ni), copper (Cu), palladium (Pd), gold (Au), or alloys thereof. In this case, the external electrodes 131 and 132 may additionally include a plating layer including Ni, Sn, or the like.

Hereinafter, an exemplary embodiment of the present disclosure will be described in more detail through experimental examples performed by the inventors of the present disclosure, but this is to aid in a detailed understanding of the present disclosure, and the scope of the present disclosure is not limited by the experimental examples.

The main component of the base material was 50 to 70 nm grade $BaTiO_3$ powder, and a detailed composition of the subcomponent is illustrated in Table 1 below. When preparing the ceramic slurry, the base material main component and subcomponent powder were mixed/dispersed using zirconia balls, and ethanol/toluene and a dispersant were mixed, followed by mechanical milling. In addition to the main component and subcomponent, a sintering aid component including Si, Al, Na, Li, or the like was added. In addition, a binder mixing process was added to increase the strength of the dielectric sheet. A ceramic green sheet for an active portion was formed using the prepared slurry, and a paste for an internal electrode was applied thereon, to be manufactured to have a thickness of about 10-20 μm using an on-roll forming coater of a head ejection method. The formed sheet as above was attached to the exposed portion of the internal electrode of the laminate for the active portion. On the other hand, in the case of the samples in Table 1, the content of the subcomponent represents the molar content added (based on the molar content of the subcomponent element present in the sintered body), based on 100 moles of the main component of $BaTiO_3$, and the standards for each symbol are as follows. In the case of the rare earth element of the first subcomponent, Tb and Dy were added. However, other rare earth elements such as Sc, Y, La, Nd, Eu, Gd, Ho, Er, Yb, and Lu may be added together, and a total content of rare earth elements and a content of Zr are important factors. In addition to the first and second subcomponents, 2.0 mol of Ba component as a third subcomponent in a form of $BaCO_3$ was added to all samples. Meanwhile, in Table 1 below, the standards for each symbol are as follows.

TABLE 1

|     | Zr   | RE  | Zr/RE | High temperature reliability | Moisture resistance reliability |
| --- | ---- | --- | ----- | ---- | ---- |
| 1   | 0.10 | 1.6 | 0.06  | X    | X    |
| 2   | 0.30 | 1.6 | 0.19  | ○    | Δ    |
| 3*  | 0.50 | 1.6 | 0.31  | ◎    | ◎    |
| 4   | 0.70 | 1.6 | 0.44  | Δ    | X    |
| 5   | 0.90 | 1.6 | 0.56  | X    | X    |
| 6   | 1.1  | 1.6 | 0.69  | X    | X    |
| 7   | 0.10 | 3.0 | 0.03  | X    | X    |
| 8   | 0.30 | 3.0 | 0.10  | Δ    | X    |
| 9   | 0.50 | 3.0 | 0.17  | Δ    | Δ    |
| 10* | 0.70 | 3.0 | 0.23  | ◎    | ◎    |
| 11* | 0.90 | 3.0 | 0.30  | ◎    | ◎    |
| 12* | 1.1  | 3.0 | 0.37  | ○    | ○    |
| 13  | 0.10 | 4.0 | 0.03  | X    | X    |
| 14  | 0.30 | 4.0 | 0.08  | X    | X    |
| 15  | 0.50 | 4.0 | 0.13  | ○    | Δ    |
| 16  | 0.70 | 4.0 | 0.18  | ○    | Δ    |
| 17* | 0.90 | 4.0 | 0.23  | ◎    | ◎    |
| 18* | 1.1  | 4.0 | 0.28  | ◎    | ◎    |
| 19  | 1.5  | 4.0 | 0.38  | Δ    | Δ    |
| 20* | 1.3  | 4.0 | 0.33  | ○    | ○    |
| 21  | 2.0  | 4.0 | 0.50  | X    | X    |
| 22  | 2.2  | 4.0 | 0.55  | X    | X    |
| 23* | 1.5  | 5.0 | 0.30  | ◎    | ◎    |
| 24* | 1.7  | 5.0 | 0.34  | ○    | ○    |
| 25  | 2.0  | 5.0 | 0.40  | Δ    | Δ    |
| 26  | 2.2  | 5.0 | 0.44  | X    | X    |
| 27* | 1.5  | 5.0 | 0.30  | ◎    | ◎    |
| 28  | 0.80 | 5.0 | 0.16  | Δ    | Δ    |
| 29  | 0.50 | 5.0 | 0.10  | Δ    | X    |

◎: Excellent,
○: Good,
Δ: Normal,
X: Poor

Figure 5A:
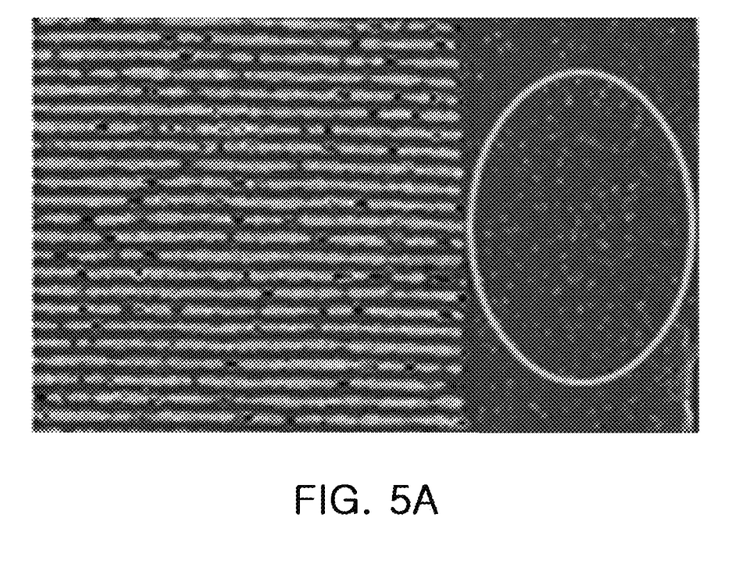
FIGS. 5A and 5B are images illustrating aspects of density and grain growth of the side margin portion, respectively.
Figure 5B:
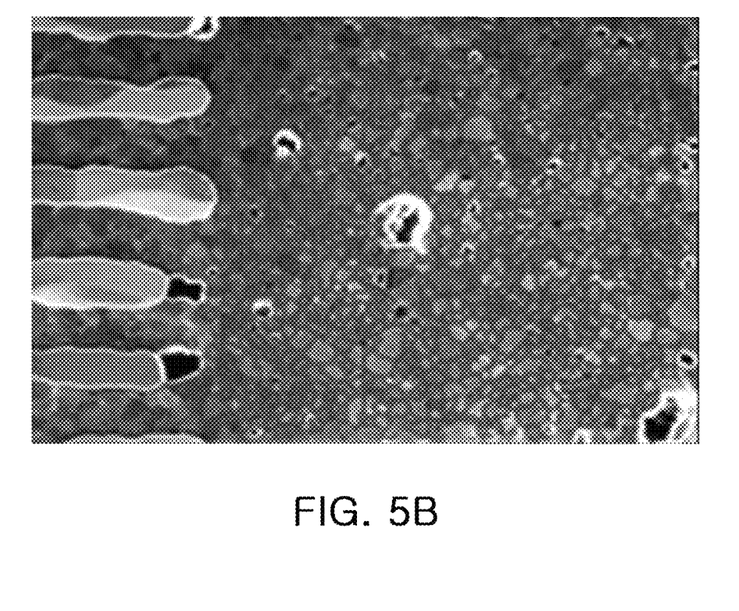
Figure 6A:
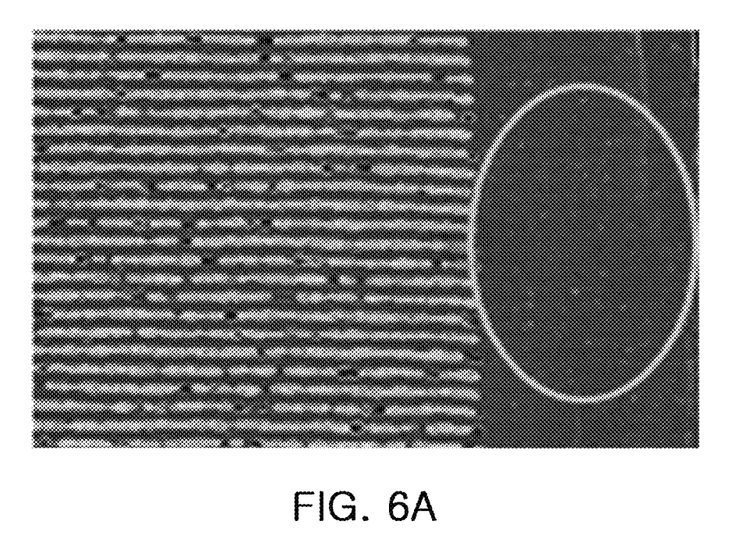
FIGS. 6A and 6B are images illustrating aspects of density and grain growth of the side margin portion, respectively.
Figure 6B:
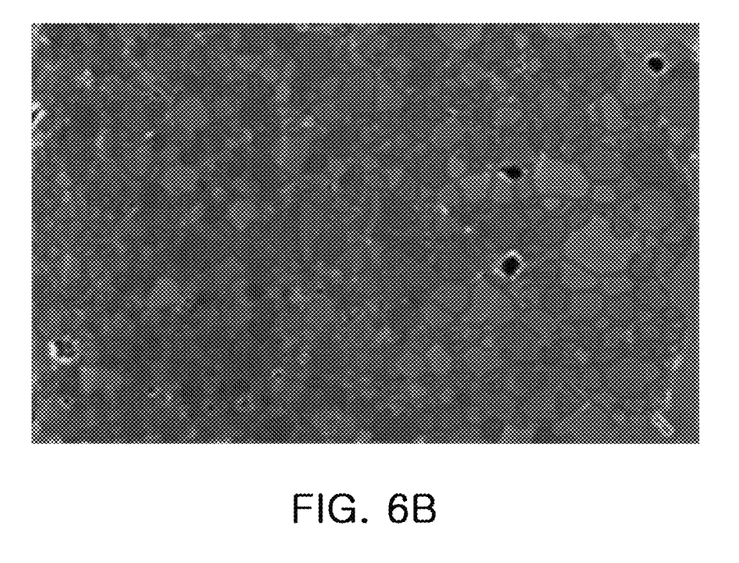
Figure 7A:
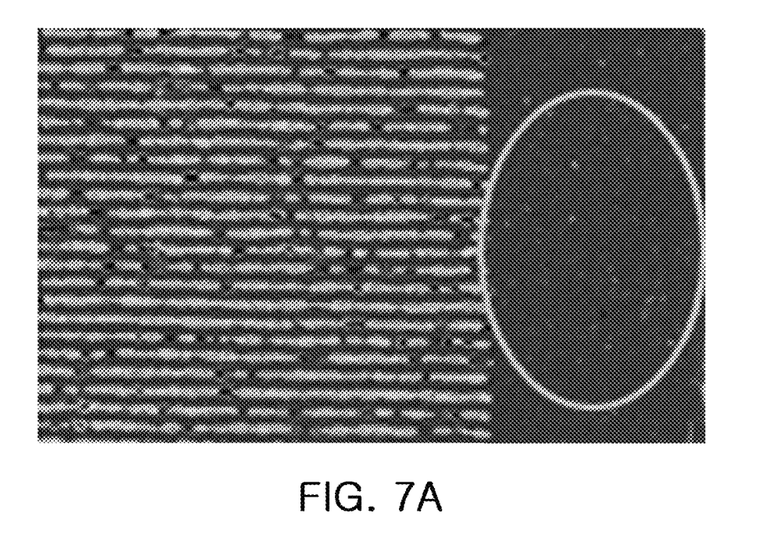
FIGS. 7A and 7B are images illustrating aspects of density and grain growth of the side margin portion, respectively.
Figure 7B:
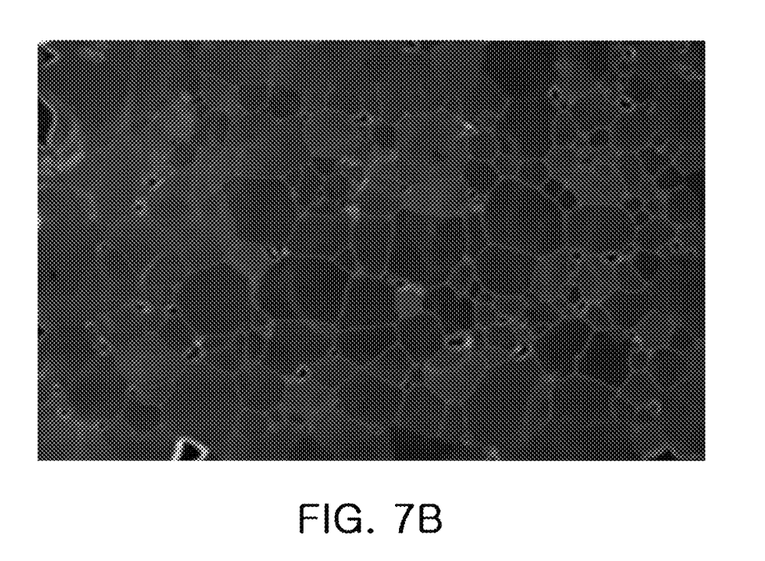
Figure 8A:
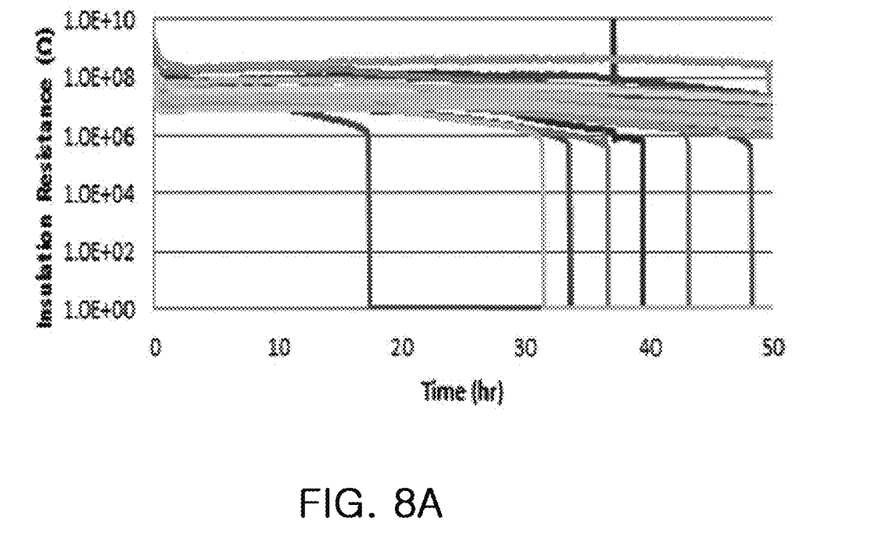
FIGS. 8A and 8B are graphs illustrating experimental results of high temperature reliability and moisture resistance reliability, respectively.
Figure 8B:
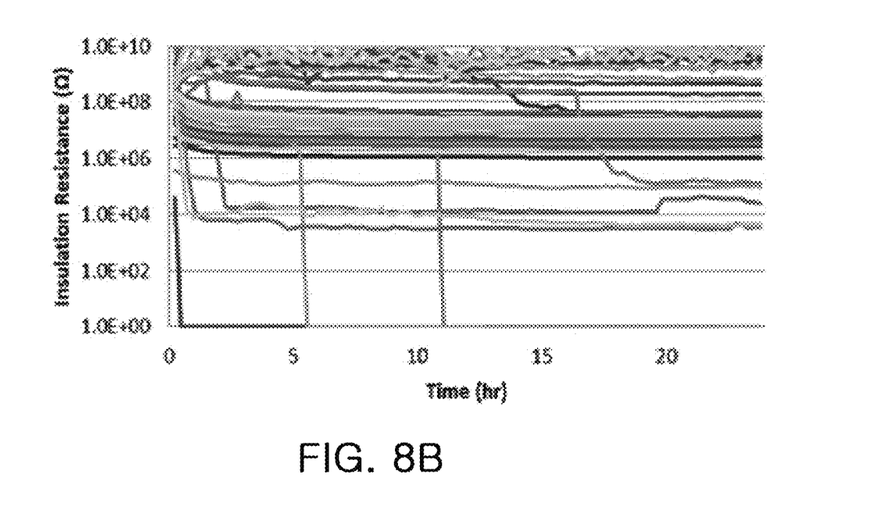
Figure 9A:
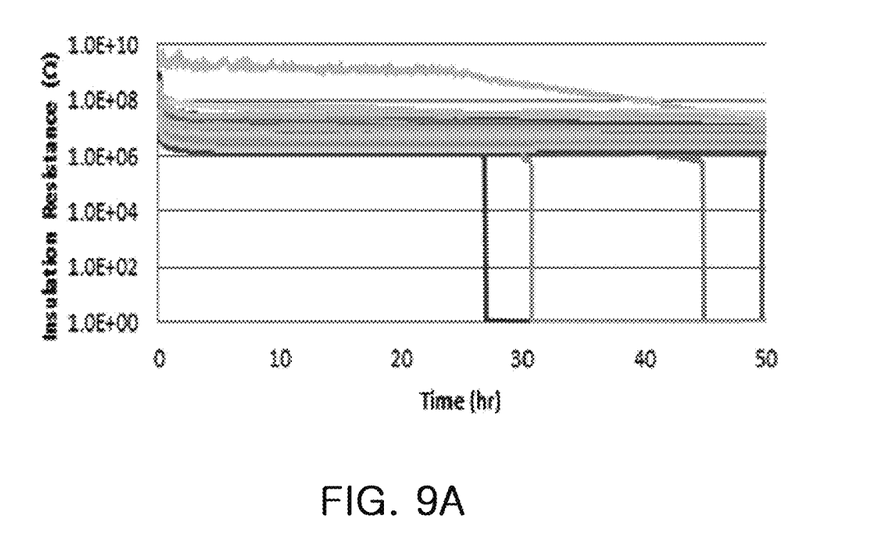
FIGS. 9A and 9B are graphs illustrating experimental results of high temperature reliability and moisture resistance reliability, respectively.
Figure 9B:
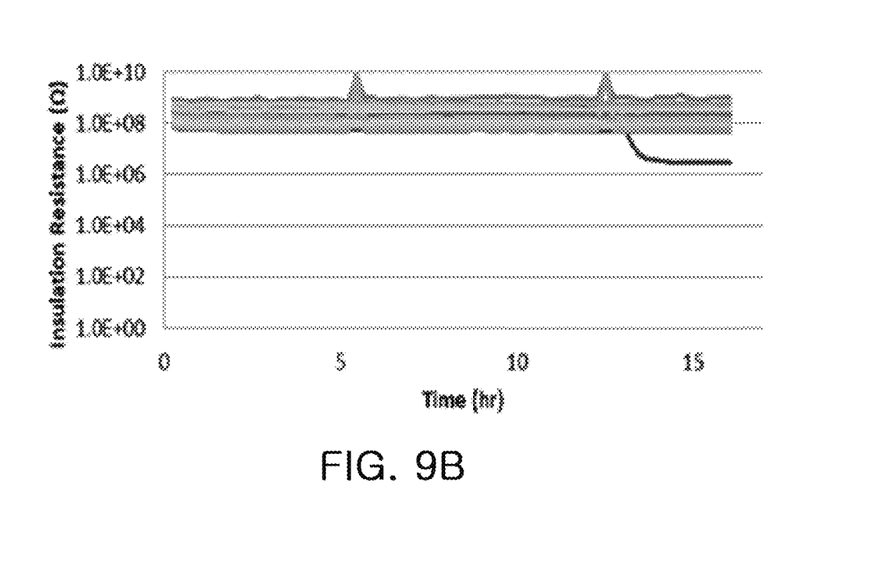
Figure 10A:
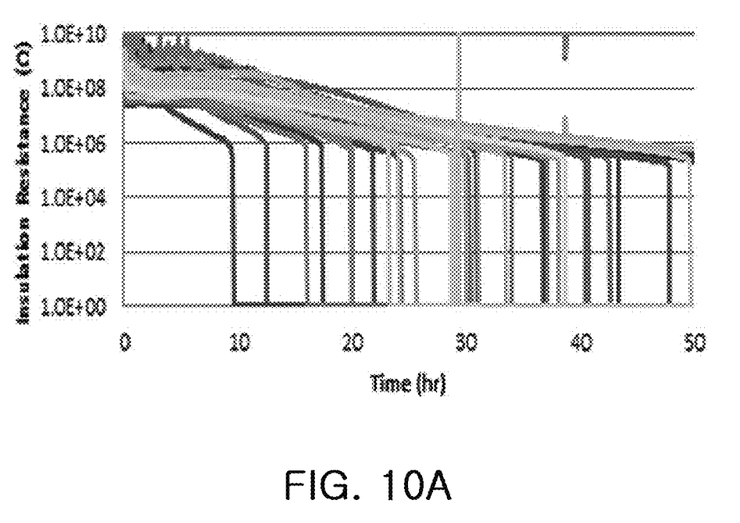
FIGS. 10A and 10B are graphs illustrating experimental results of high temperature reliability and moisture resistance reliability, respectively.
Figure 10B:
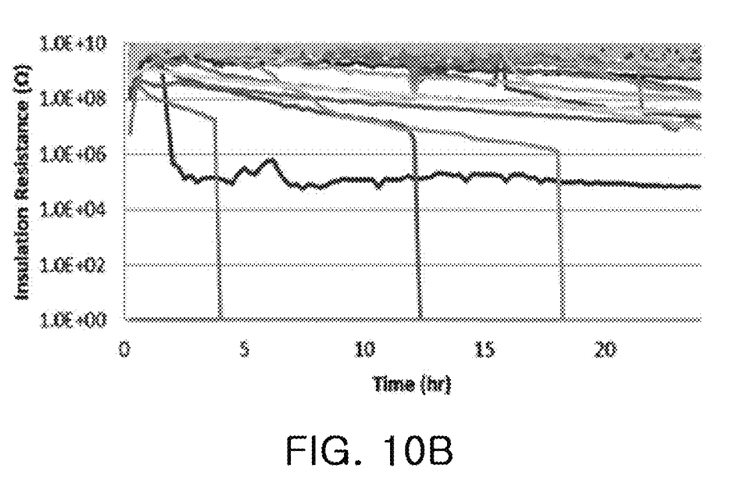

The ceramic laminate in the form of a green chip, which was prepared as described above, was subjected to a binder burn-out process in a nitrogen atmosphere at 400° C. or less and was sintered at a sintering temperature of 1200° C. or less and a hydrogen concentration of 0.5% or less of $H_2$. Then, the obtained samples were measured for high temperature reliability and moisture-resistance reliability. FIGS. 5A and 5B are images showing aspects of density and grain growth of the side margin portion, respectively. Here, FIGS. 5A and 5B show samples having Zr/RE<0.20. FIGS. 6A and 6B are images illustrating aspects of density and grain growth of the side margin portion, respectively. FIGS. 6A and 6B show samples satisfying a condition 0.20≤Zr/RE≤0.37 (Samples 3, 10-12, 17-18, 20, 23-24, 27) marked with * as an embodiment of the present disclosure). FIGS. 7A and 7B are images illustrating aspects of density and grain growth of the side margin portion, respectively. FIGS. 7A and 7B correspond to samples with 0.37<Zr/RE. In addition, FIGS. 8A, 8B, 9A, 9B, 10A, and 10B are graphs showing experimental results of high temperature reliability (FIGS. 8A, 9A, 10A) and moisture resistance reliability (FIGS. 8B, 9B, 10B), which correspond to the samples of FIGS. 5A, 5B, 6A, 6B, 7A, and 7B, respectively. As can be seen from the experimental results in Table 1 and FIGS. 5A, 5B, 6A, 6B, 7A, 7B, 8A, 8B, 9A, 9B, 10A, and 10B, it can be confirmed that, when an additive content condition of a dielectric in a side margin portion is 0.20≤Zr/RE≤0.37, the density and grain growth of the side margin portion are good, and accordingly, a level of high temperature reliability and moisture resistance reliability is improved (FIGS. 6A, 6B, 9A, and 9B). On the contrary, in the case of the samples having Zr/RE<0.20 (FIGS. 5A, 5B, 8A, and 8B), it can be seen that the density of the dielectric is low in the side margin portion and grain growth of the margin portion is also small, and accordingly, both high temperature reliability and moisture resistance reliability characteristics were deteriorated. In addition, in the case of the samples with 0.37<Zr/RE (FIGS. 7A, 7B, 10A, and 10B), it can be confirmed that the density of the side margin portion was at a good level, but grain growth occurred excessively, and accordingly, in particular, high temperature reliability was deteriorated.

In conclusion, according to the above experimental results, when the condition of 0.20≤Zr/RE≤0.37 is satisfied, the density of the side margin portion is excellent, and grains are refined such that a size of the grains may be made uniform. Accordingly, reliability such as withstand voltage characteristics of the multilayer capacitor to which it is applied may be improved. As an example of a preferable condition, the condition for the molar content of Zr may be 0.50 mol≤Zr≤1.7, and when expressed as a ratio with the content of Ba, 0.25≤Zr/Ba≤0.85.

As set forth above, in the case of a dielectric composition according to an embodiment of the present disclosure, grain growth may be effectively suppressed while advantageous for densification during sintering, and reliability may be improved when used in a multilayer capacitor.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer capacitor, comprising:
   a body, and
   an external electrode disposed outside the body,
   wherein the body includes
      an active portion including a plurality of dielectric layers and a plurality of internal electrodes stacked with dielectric layers interposed therebetween, and
   a side margin portion covering at least one side surface of side surfaces from which the internal electrodes extend,
   wherein the side margin portion includes a dielectric including a $BaTiO_3$-based main component, a first subcomponent including a rare earth element, a second subcomponent including Zr, and a third subcomponent including Ba,
   wherein, based on a molar content per 100 moles of the $BaTiO_3$-based main component, when a molar content of the rare earth element is RE, a molar content of Zr and RE satisfy $0.23 \leq Zr/RE \leq 0.37$, and
   wherein a molar content of Zr in an interface portion of the active portion, adjacent to the side margin portion is higher than a molar content of Zr in a central portion of the active portion.

2. The multilayer capacitor of claim 1, wherein the rare earth element comprises at least one element selected from the group consisting of Sc, Y, La, Nd, Eu, Gd, Tb, Dy, Ho, Er, Yb, and Lu.

3. The multilayer capacitor of claim 1, wherein the molar content of Zr and a molar content of Ba in the third subcomponent satisfy $0.25 \leq Zr/Ba \leq 0.85$.

4. The multilayer capacitor of claim 3, wherein the molar content of Zr and the molar content of Ba in the third subcomponent satisfy $0.25 \leq Zr/Ba \leq 0.75$.

5. The multilayer capacitor of claim 1, wherein the central portion of the active portion is free of Zr.

6. The multilayer capacitor of claim 1, wherein the dielectric of the side margin portion comprises a dielectric grain having a core-shell structure including a core portion and a shell portion having a composition different from that of the core portion.

7. The multilayer capacitor of claim 6, wherein the shell portion satisfies $0.23 \leq Zr/RE \leq 0.37$.

8. The multilayer capacitor of claim 1, wherein the rare earth element includes Tb.

9. The multilayer capacitor of claim 1, wherein the rare earth element includes Tb and Dy.

10. The multilayer capacitor of claim 1, wherein the molar content of Zr is 0.50 to 1.7 moles based on 100 moles of the $BaTiO_3$-based main component.

11. The multilayer capacitor of claim 1, wherein the molar content of Zr is 0.50 to 1.5 moles based on 100 moles of the $BaTiO_3$-based main component.

12. The multilayer capacitor of claim 1, wherein RE is 1.6 to 5.0 moles based on 100 moles of the $BaTiO_3$-based main component.

13. The multilayer capacitor of claim 1, wherein the molar content of Zr and RE satisfy $0.23 \leq Zr/RE \leq 0.33$.

14. The multilayer capacitor of claim 1, wherein the rare earth element includes Tb and Dy,
   wherein RE is 1.6 to 5.0 moles based on 100 moles of the $BaTiO_3$-based main component,
   wherein the molar content of Zr and a molar content of Ba in the third subcomponent satisfy $0.25 \leq Zr/Ba \leq 0.85$,
   wherein the molar content of Zr is 0.50 to 1.7 moles based on 100 moles of the $BaTiO_3$-based main component, and
   wherein a central portion of the active portion is free of Zr.

* * * * *